F. L. WADHAM.
TIRE.
APPLICATION FILED OCT. 15, 1917.
1,327,794.
Patented Jan. 13, 1920.
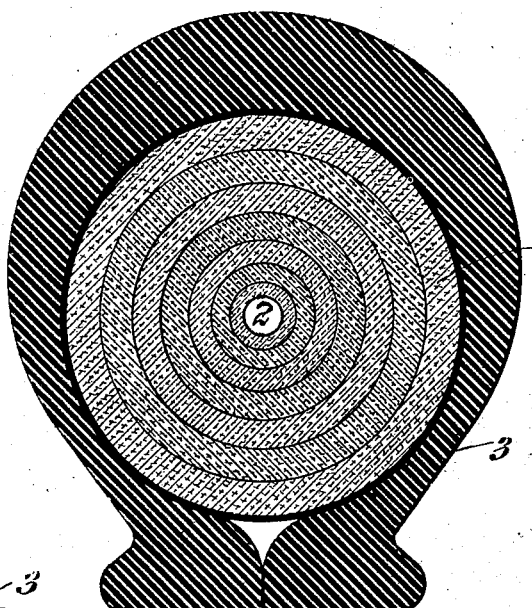
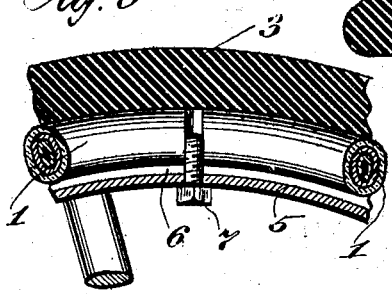
Fig. 5
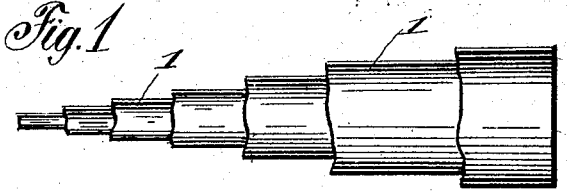
Fig. 1
Fig. 2
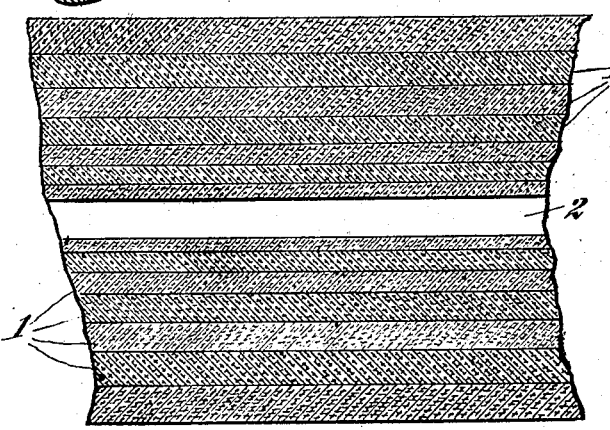
Fig. 3
Fig. 4
Witness
Charles Balg
Karl H. Butler
Inventor
Frank L. Wadham
By
Attorneys

UNITED STATES PATENT OFFICE.

FRANK L. WADHAM, OF DETROIT, MICHIGAN.

TIRE.

1,327,794.   Specification of Letters Patent.   Patented Jan. 13, 1920.

Application filed October 15, 1917. Serial No. 196,628.

*To all whom it may concern:*

Be it known that I, FRANK L. WADHAM, a citizen of the United States of America, residing at Detroit, in the county of Wayne and State of Michigan, have invented certain new and useful Improvements in Tires, of which the following is a specification, reference being had therein to the accompanying drawings.

This invention relates to tires, and my invention aims to provide a filler or inner member for the outer casing of a tire which will obviate the necessity of using an inner pneumatic tube in an outer casing to insure resiliency or a cushion tire for a vehicle wheel. The filler or inner member which I employ consists of new or discarded hose of various diameters, one inserted in the other until there is practically a solid cylindrical member that may be laid in the outer casing of the tire and inclosed thereby, thus providing practically a solid rubber tire possessing a degree of resiliency sufficient to cushion the wheel of a vehicle, without any danger of the tire being punctured, deflated and suddenly rendered useless.

The tire will be hereinafter more fully described and then claimed, and reference will now be had to the drawing, wherein Figure 1 is a cross sectional view of a tire in accordance with my invention;

Fig. 2 is a plan of a portion of the filler or inner member of the tire;

Fig. 3 is an enlarged longitudinal sectional view of the same,

Fig. 4 is a view of one end of the filler or inner member, showing practically a solid structure, and Fig. 5 is a longitudinal sectional view of a portion of a tire, showing an anti-creeping device for the tire filler.

To prepare the filler or inner member, I select a plurality of sections of hose 1, all of the same length, but of different diameters, so that the sections may telescope one another, as best shown in Fig. 2, and provide an inner member or filler that is composed of concentrically arranged sections of hose. In selecting the sections of hose 1, it is preferable to use hose of such diameter that one will snugly fit within the other and when completely assembled provide a filler or inner member that has an exceedingly small bore 2, which is preferably of less diameter than the radial thickness of the assembled hose.

The hose selected may be of the steam or ordinary garden hose variety made of rubber and canvas, and for the sections of hose of small diameter, various kinds of rubber tubing may be employed, thus providing a filler or inner member that will have the innermost concentric sections thereof composed of more rubber than the outer sections, thereby providing a resilient inner part for the filler or inner member.

The filler or inner member may be built up in two ways. For instance, the hose can be cut in sections of equal length or approximately so and when assembling the hose the sections of different diameter can be threaded one in the other so that the joints of certain circumferentially arranged hose sections will be staggered relative to the joints of adjoining circumferential sections. This assembling is done to form a length of filler, sufficient to fill the outer casing of a tire, and prior to placing the filler in the outer casing the ends of the filler are fitted together. The ends of the filler will have certain sections of hose protruding beyond others, on account of the staggered arrangement, but these ends can be fitted into each other and thus form a flexible annulus that can be easily set in an outer tire casing. To do this it is only necessary to bend the flexible annulus, just the same as would be done with an inflated inner tube, and then the outer casing can be mounted on a rim.

In some instances it may not be desirable to fit the staggered ends of the filler together, so in such a case the ends of the filler may be cut off and brought into confronting relation as shown in Fig. 5.

To prevent a filler or inner member from creeping or shifting circumferentially of an outer casing, a screw bolt or other member 7 may be mounted in the usual air tube opening 6 of the rim or felly 5 of a wheel by threading the opening to receive the bolt, said screw bolt or member extending between the confronting ends of the filler or inner member, as clearly shown in Fig. 5.

In some instances, I may take a strip of hose or tubing, slit or split it throughout its length, and then roll the strip to provide a spiral or helically wound core member 4, which may be threaded into the innermost concentric section so as to form practically a solid filler or inner member for the outer casing.

I do not care to confine my invention to any particular make of outer casing, and while in the drawings there are illustrated the preferred embodiments of my invention, it is to be understood that such changes may be resorted to as fall within the scope of the appended claim.

What I claim is:—

The combination of an outer tire casing, sections of hose and tubing of equal length and of diameters to telescope one another and provide a concentric arrangement of said hose and tubing in said outer tire casing with a bore centrally of said hose and tubing having a diameter less than a radial thickness of the assembled hose and tubing, and the sections of said hose and tubing having the joints thereof in staggered relation, and a core in the bore of said hose and tubing made of a single length of tubing slitted throughout its length and spirally wound so as to practically fill the bore.

In testimony whereof I affix my signature in the presence of two witnesses.

FRANK L. WADHAM.

Witnesses:
KARL H. BUTLER,
CHAS. W. STAUFFIGER.